(12) United States Patent
Liu

(10) Patent No.: US 7,010,371 B2
(45) Date of Patent: Mar. 7, 2006

(54) DIGITAL AUDIO SIGNAL PLAYER HAVING A SIMULATED ANALOGUE RECORD

(75) Inventor: Han-Chih Liu, Tainan (TW)

(73) Assignee: Hanpin Electron Co., Ltd., Tainan (TW)

( * ) Notice: Subject to any disclaimer, the term of this patent is extended or adjusted under 35 U.S.C. 154(b) by 870 days.

(21) Appl. No.: 10/135,570

(22) Filed: May 1, 2002

(65) Prior Publication Data

US 2003/0208292 A1    Nov. 6, 2003

(51) Int. Cl.
*G06F 17/00* (2006.01)
*H03G 3/02* (2006.01)
*G11B 31/00* (2006.01)

(52) U.S. Cl. ............... 700/94; 381/61; 381/119; 369/70; 369/273; 369/4

(58) Field of Classification Search ........... 381/61; 700/94
See application file for complete search history.

(56) References Cited

U.S. PATENT DOCUMENTS

| | | | | |
|---|---|---|---|---|
| 5,350,882 A * | 9/1994 | Koguchi et al. | ........... | 84/636 |
| 5,502,703 A * | 3/1996 | Yamada et al. | ........... | 369/47.54 |
| 5,675,557 A * | 10/1997 | Hubinger | ........... | 369/4 |
| 6,094,491 A * | 7/2000 | Frindle et al. | ........... | 381/119 |
| 6,434,100 B1 * | 8/2002 | Usui | ........... | 369/53.31 |
| 6,535,462 B1 * | 3/2003 | Liu | ........... | 369/4 |
| 6,541,690 B1 * | 4/2003 | Segers, Jr. | ........... | 84/605 |
| 6,545,953 B1 * | 4/2003 | Herbert | ........... | 369/4 |
| 6,590,840 B1 * | 7/2003 | Inoue et al. | ........... | 369/30.27 |
| 6,618,329 B1 * | 9/2003 | Liu | ........... | 369/4 |
| 6,687,193 B1 * | 2/2004 | Jung | ........... | 369/4 |
| 6,745,091 B1 * | 6/2004 | Liu | ........... | 700/94 |
| 6,751,167 B1 * | 6/2004 | Yamada et al. | ........... | 369/30.19 |
| 6,804,179 B1 * | 10/2004 | Miyashita et al. | ........... | 369/30.23 |
| 6,818,815 B1 * | 11/2004 | Cohen | ........... | 369/47.23 |
| 6,961,289 B1 * | 11/2005 | Liu | ........... | 369/4 |
| 2003/0029305 A1 * | 2/2003 | Kent et al. | ........... | 84/645 |
| 2003/0165100 A1 * | 9/2003 | Kikuchi | ........... | 369/53.3 |
| 2005/0052981 A1 * | 3/2005 | Shim et al. | ........... | 369/59.26 |
| 2005/0068857 A1 * | 3/2005 | Hori | ........... | 369/30.27 |
| 2005/0068867 A1 * | 3/2005 | Usui | ........... | 369/47.32 |

* cited by examiner

*Primary Examiner*—Vivian Chin
*Assistant Examiner*—Andrew Graham
(74) *Attorney, Agent, or Firm*—Rosenberg, Klein & Lee

(57) ABSTRACT

In a digital audio signal player having a simulated analogue record, a high frequency alternator is provided, which is connected to the microprocessor, and constantly sends out a high-frequency signal; the alternator has an output terminal electrically connected to a diode connected to the microprocessor; a control element is also connected to the diode. Music is played in a normal way when the microprocessor receives high-frequency signal in a non-reduced form. The control element will send an interfering signal to the diode to reduce high frequency signal passing through the diode when touched by hands, thus making the microprocessor receive high frequency signal in reduced form; music is played with speed and direction changing according to the movement of the control element when the microprocessor receives the reduced high frequency signal. Music is played normally as soon as hands are removed from the control element.

1 Claim, 2 Drawing Sheets

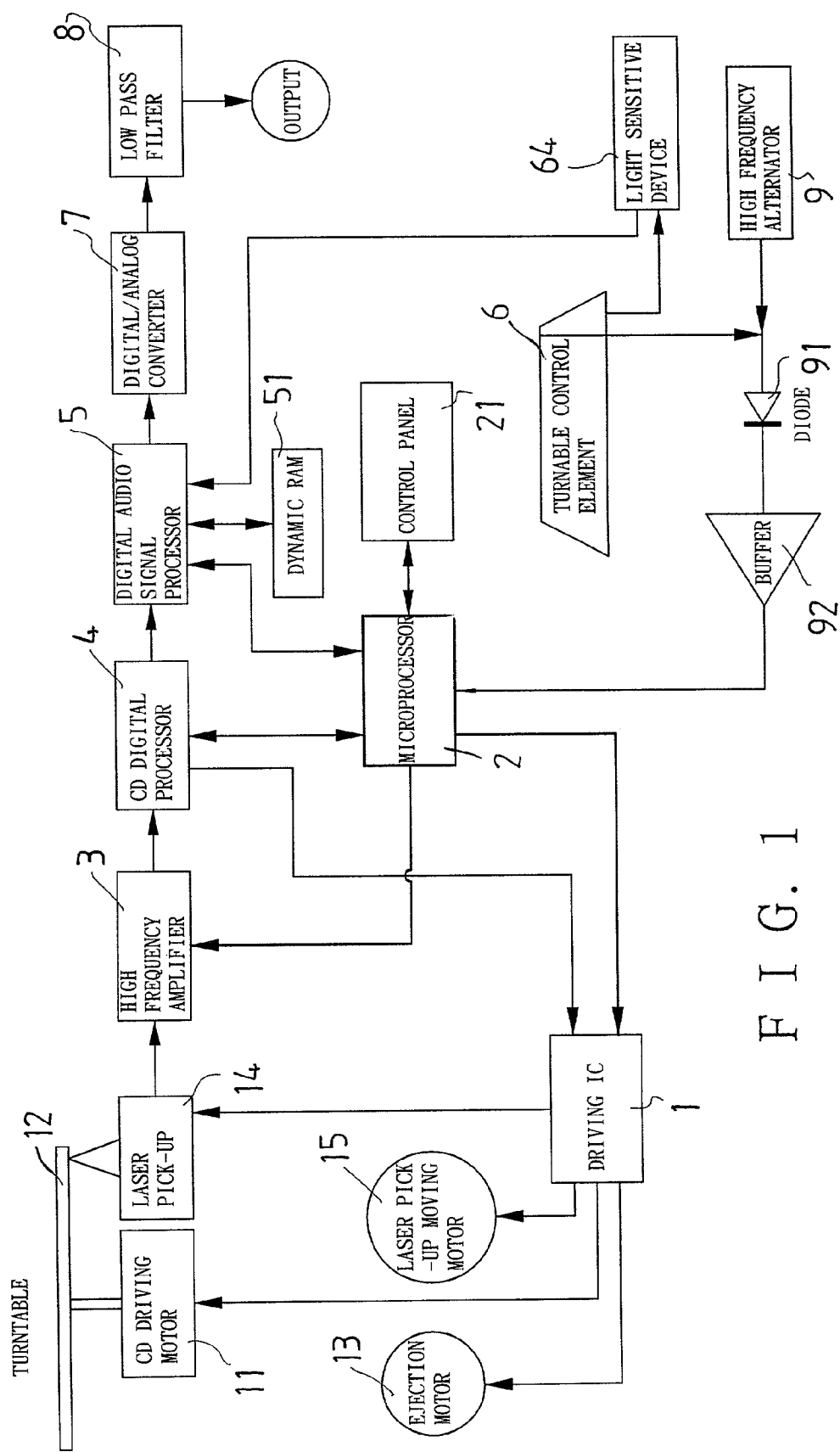
F I G. 1

DIGITAL AUDIO SIGNAL PLAYER HAVING A SIMULATED ANALOGUE RECORD

BACKGROUND OF THE INVENTION

The present invention relates to a digital audio signal player having a simulated analogue record, which is equipped with turnable control element for a DJ to turn to simulate an analogue record played being moved on the turntable by the DJ so that music is played with tone and speed being changed in accordance with the movement of the DJ's hands, more particularly the present invention provides a digital audio signal player having a simulated analogue record of the above mentioned nature that is not subject to magnetic interference of people and electronic equipments in the vicinity thereof.

In order to help increase lively and exciting atmosphere in a concert or a party such as is held in a PUB or a dancing hall, the DJ would make the music played with changing tone and speed by means of moving the analogue record on the turntable in various ways. When the DJ stops moving the record with his hands, the record will be played on the record player on a normal way immediately.

However, a single analogue has very limited capacity for storing music, therefore the DJ has to prepare a lot of records in each party that are likely to cause him inconvenience due to the large size and heavy weight.

In order to overcome the above disadvantages, the inventor of the present invention had disclosed a digital audio signal player having a simulated analogue record, which includes a driving IC 1, a CD driving motor 11, a turntable 12, an ejection motor 13, a laser pick-up 14, a laser pick-up moving motor 15, a microprocessor 2, a control panel 21, a high frequency amplifier 3, a CD digital processor 4, a digital audio signal processor 5, a dynamic RAM 51, a digital/analog converter 7, a turnable control element 6, a glitch detecting circuit 63 and a low pass filter 8.

The turntable 12 is provided for holding an analogue CD, and connected to the CD driving motor 11. The driving IC 1 is electrically connected to both the CD driving motor 11 and the ejection motor 13 for activating the same to turn the turntable 12 and to eject the turntable 12 for removal of the CD respectively.

When the microprocessor 2 is activated, the same will make the high frequency amplifier 3 send out laser light, and make the CD digital processor 4 activate the laser pick-up 14 by means of the driving IC 1. The driving IC 1 will also activate the laser pick-up moving motor 15 to move the laser pick-up 14. The laser pick-up 14 sends a signal to the CD digital processor 4 via the high frequency amplifier 3 such that the CD digital processor 4 can inform the microprocessor 2 whether the laser light has focused; if the laser light fails to focus, the microprocessor 2 will stop; if the laser light has focused successfully, the microprocessor 2 activates the CD digital processor 4 to make the CD driving motor 11 work via the driving IC 1 such that the analogue CD positioned on the turntable 12 is rotated at twice the normal speed. And, the laser pick-up 14 reads the data of the analogue CD, and sends the data to both the microprocessor 2 and the digital audio signal processor 5 via the high frequency amplifier 3 and the CD digital processor 4; the microprocessor 2 will also make the control panel 21 show information about the CD, the digital audio signal process 5 will store the data of the CD in the dynamic RAM 51. A control panel 21 is connected to the microprocessor 2 so that information about the CD can be shown.

The turnable control element 6 is made of conductive materials and has a round shape, and electrically connected to the digital audio signal processor 5. The control element 6 normally sends out original signal 61, and will send out an interfering signal 62, which is stronger than the signal 61, when the same is touched by a person's hand. A sensor (not shown) of the control element 6 will senses the rotating speed and direction of the control element 6. The interfering signal 62 will be processed by an interfering signal detecting circuit 63, and then sent to the microprocessor 2. The digital/analog converter 7 is electrically connected to both the digital audio signal processor 5 and the low pass filter 8. The microprocessor 2 can make comparison between the signal 61 and the interfering signal 62, and determine that a user has touched the control element 6 if the difference between the signal 61 and the interfering signal 62 exceeds a predetermined amount.

Thus, when a user such as a DJ rotates the turnable control element 6 with the hands, the digital audio signal processor 5 will process and sent out the data stored in the dynamic RAM 51 in a manner according to the movement of the control element 6 sensed by the sensor, i.e. the user can control the speed and tone of the data send out from the digital audio signal processor 5. Then, the data is converted into analogue ones by means of the digital/analog converter 7. And, the analogue data are processed by the low pass filter 8, and played as music. When the user stops touching or moving the control element 6, the interfering signal 62 will disappear immediately, and accordingly the microprocessor 2 and the digital audio signal processor 5 will begin to play the music in the normal way.

Although the above player with simulated analogue record can play music with changing tone and speed to help increase lively and exciting atmosphere when a DJ rotate the turnable control element to simulate a record being rotated by the hand, it is found to have a disadvantage that the interfering signal detecting circuit 63 will sense other magnetic interference that is produced by the crowd and various electronic equipments in a dancing hall, thus wrongly making music played with changing tone and speed when the DJ doesn't intend to.

SUMMARY OF THE INVENTION

Therefore, it is a main object of the present invention to provide a digital audio signal player having a simulated analogue record that is not subject to magnetic interference of people and electronic equipments in the vicinity thereof.

In the present invention, a high frequency alternator is provided, which is connected to the microprocessor, and constantly sends out a high frequency signal; the high frequency alternator having an output terminal electrically connected to P pole of a diode connected in series with a buffer electrically connected to the microprocessor, the turnable control element having an output terminal also connected to the P pole of the diode. The music is played in a normal way when the microprocessor receives the high frequency signal in a non-reduced form; the turnable control element will send an interfering signal to the diode so as to reduce the high frequency signal passing through the diode when touched by a hand of a person, thus making the microprocessor receive a high frequency signal in a reduced form from the high frequency alternator so that music is played with changing speed and direction according to the movement of the turnable control element.

BRIEF DESCRIPTION OF THE DRAWINGS

This invention will be better understood by referring to the accompanying drawings, wherein:

FIG. 1 is a block diagram of the circuit of the digital audio signal player having a simulated analogue record of the present invention.

DETAILED DESCRIPTION OF THE PREFERRED EMBODIMENTS

Figure 2:
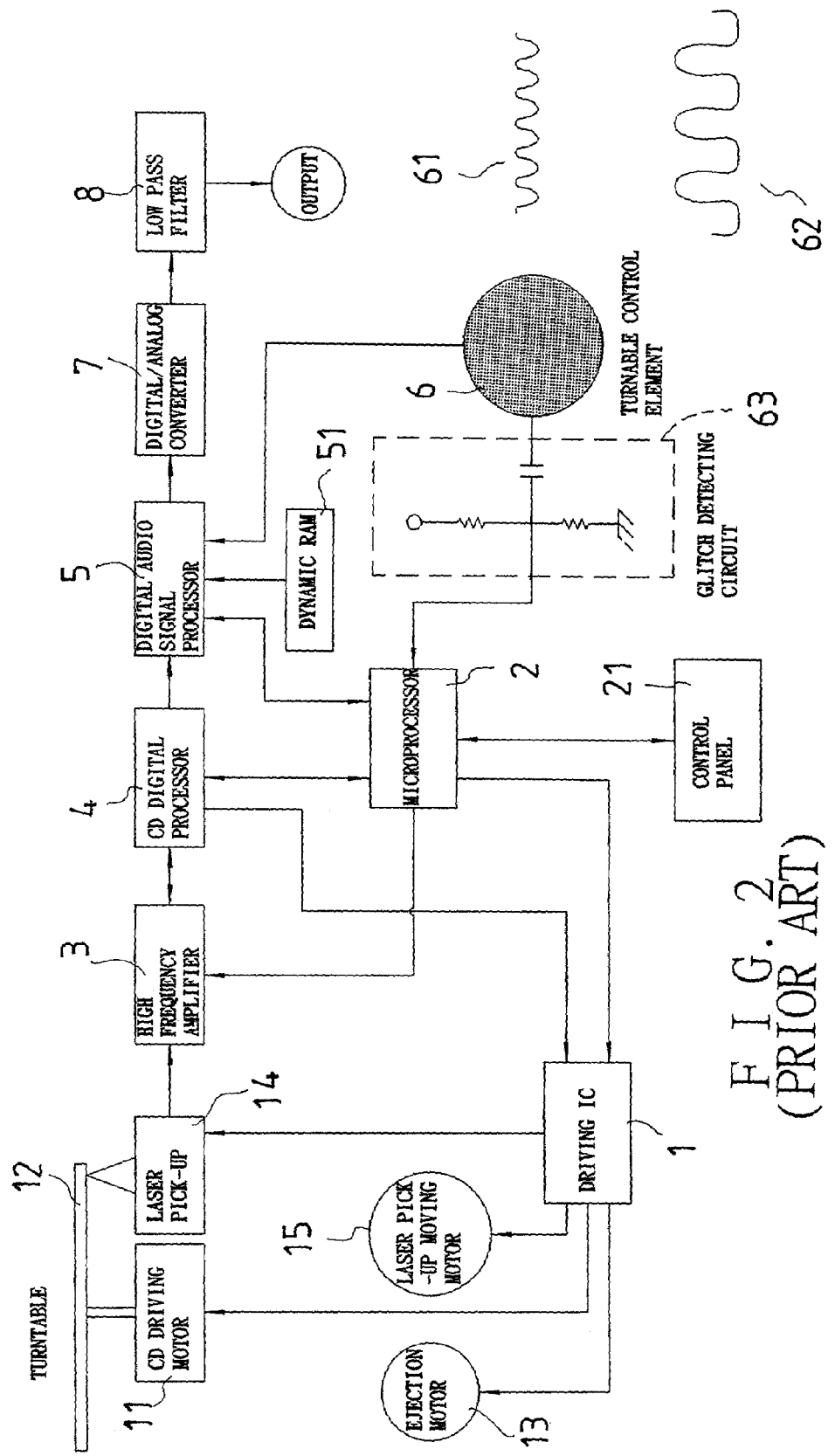
FIG. 2 is a block diagram of the circuit of the prior digital audio signal player having a simulated analogue record as described in the Background.

Referring to FIG. 1, a digital audio signal player having a simulated analogue record of the present invention includes a driving IC 1, a microprocessor 2, a high frequency amplifier 3, a CD digital processor 4, a digital audio signal processor 5, a dynamic RAM 51, a digital/analog converter 7, a turnable control element 6, a high frequency alternator 9, and a low pass filter 8.

The high frequency amplifier 3 is electrically connected to the microprocessor 2 to send out laser light when activated by the microprocessor 2. The CD digital processor 4 is electrically connected to both the microprocessor 2 and the high frequency amplifier 3. The CD digital processor 4 informs the microprocessor 2 of status of focusing of the laser light so that the microprocessor 2 will stop working when the laser light fails to focus, and will activate a CD driving motor 11 to rotate a CD turntable 12 at twice a normal speed when the laser light succeeds in focusing. The driving IC 1 will activate a laser pick-up moving motor 15 to move a laser pick-up 14. The driving IC 1 is electrically connected to an ejection motor 13 for activating the same to eject the turntable 12 for removal of the CD.

The digital audio signal processor 5 is electrically connected to both the microprocessor 2 and the CD digital processor 4. The laser pick-up 14 is electrically connected to lie high frequency amplifier 3, and will send data of the CD to the digital audio signal processor 5 via the CD digital processor 4.

The digital audio signal processor 5 includes a dynamic RAM 51 to store the data of the CD with which.

The digital/analog converter 7 is electrically connected to the digital audio signal processor 5 for converting the digital data from the digital audio signal processor 5 into analogue ones, which are then sent through a low pass filter 8 and played as music. In addition, a control panel 21 is connected to the microprocessor 2 so that information about the CD can be shown.

The turnable control element 6 is made of conductive materials, and is electrically connected to the digital audio signal processor 5. The turnable control element has a light sensitive device 64, which will senses rotating speed and direction thereof.

The high frequency alternator 9 constantly sends out a high frequency signal, and has an output terminal electrically connected to P pole of a diode 91 connected in series with a buffer 92 electrically connected to the microprocessor 2; the turnable control element 6 also has an output terminal connected to the P pole of the diode 91. The microprocessor 2 makes the digital audio signal processor 5 send out the digital data stored in the RAM in a normal way so that the music is played in an original manner when it receives the high frequency signal in a non-reduced form. Because a human body has capacitance, the turnable control element 6 will send an interfering signal to the diode 91 so as to reduce the high frequency signal passing through the diode 91 when touched by a hand of a person, thus making the microprocessor 2 receive a high frequency signal in a reduced form from the high frequency alternator 9. The microprocessor 2 makes the digital audio signal processor 5 send out the digital data in a manner according to the movement of the turnable control element 6 as sensed by the light sensitive device 64 when receiving the reduced high frequency signal.

Therefore, music can be played with changing speed and direction by means of rotating the turnable control element 6 with a hand, and can be played in a normal way as soon as the hand is removed from the turnable control element 6. The present audio signal player won't wrongly make music played with changing direction and speed when the DJ doesn't intend to because it is not subject to magnetic interference of the crowd and electronic equipments in the vicinity thereof.

What is claimed is:

1. A digital audio signal player having a simulated analogue record, comprising
   a microprocessor;
   a high frequency amplifier, the high frequency amplifier being electrically connected to the microprocessor to send out laser light when activated by the microprocessor;
   a CD digital processor electrically connected to both the microprocessor and the high frequency amplifier; the CD digital processor informing the microprocessor of status of focusing of the laser light so that the microprocessor will stop working when the laser light fails to focus, and will activate a CD driving motor to rotate a CD turntable at twice a normal speed when the laser light succeeds in focusing;
   a digital audio signal processor electrically connected to both the microprocessor and the CD digital processor;
   a laser pick-up electrically connected to the high frequency amplifier;
   the laser pick-up sending data of the CD to the CD digital processor;
   the digital audio signal processor including a dynamic RAM to store the data of the CD with which;
   a digital/analog converter electrically connected to the digital audio signal processor for converting the digital data from the digital audio signal processor into analogue ones, which are then sent through a low pass filter and played as music;
   a low pass filter electrically connected to the digital/analog converter; and,
   a turnable control element made of conductive materials, and electrically connected to both the digital audio signal processor and the microprocessor; the turnable control element having a light sensitive device, which will senses rotating speed and direction thereof;
   and being characterized by a high frequency alternator constantly sending out a high frequency signal; the high frequency alternator having an output terminal electrically connected to P pole of a diode connected in series with a buffer electrically connected to the microprocessor; the turnable control element having an output terminal also connected to the P pole of the diode; the microprocessor making the digital audio signal processor send out the digital data stored in the RAM in a normal way so that the music is played in a normal way when it receives the high frequency signal in a non-reduced form; the turnable control element sending an interfering signal to the diode so as to reduce the high frequency signal through the diode when touched by a hand of a person, thus making the microprocessor receive a high frequency signal in a reduced form from the high frequency alternator; the microprocessor making the digital audio signal processor send out the digital data in a manner according to the movement of the turnable control element as sensed by the light sensitive device when receiving the reduced high frequency signal;

whereby music can be played with changing direction and speed by means of rotating the turnable control element with a hand; music being played in an original way as soon as the hand is removed from the turnable control element for disappearance of the interfering signal, allowing the high frequency signal to be sent to the microprocessor in a non-reduced form.

* * * * *